Aug. 14, 1951 P. F. ROSSMANN ET AL 2,564,312
METHOD OF MAKING SOUND MOTION-PICTURE FILM
Filed June 9, 1949
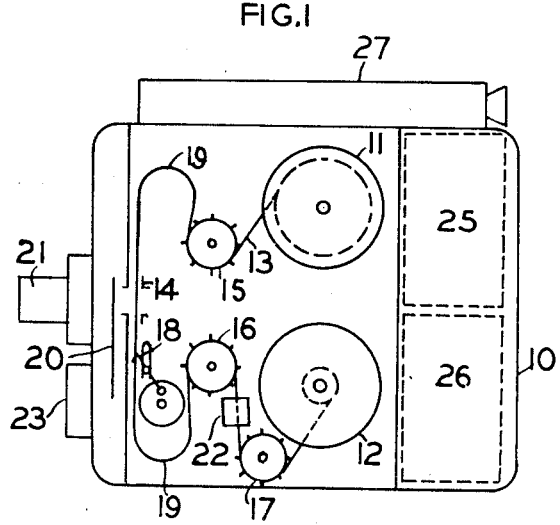
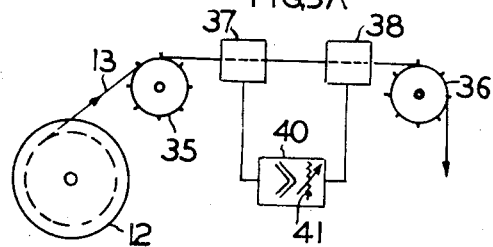
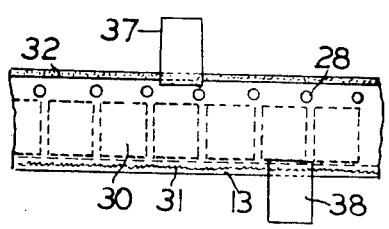
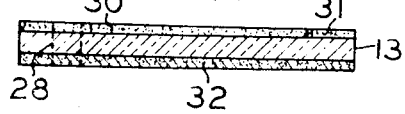
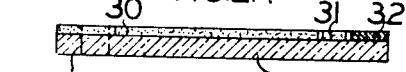
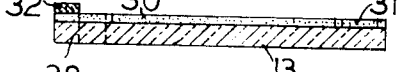
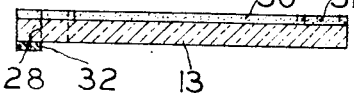
INVENTORS
PETER F. ROSSMANN &
BY   KARL RATH Patented Aug. 14, 1951

2,564,312

UNITED STATES PATENT OFFICE 2,564,312

METHOD OF MAKING SOUND MOTION-PICTURE FILM

Peter F. Rossmann, Depew, and Karl Rath, New York, N. Y.

Application June 9, 1949, Serial No. 97,976

4 Claims. (Cl. 88—16.2)

This application is a continuation-in-part of application Serial Number 743,490, filed April 24, 1947, entitled Means for and Method of Producing Sound Film, which issued as Patent No. 2,479,868 on August 23, 1949.

The present invention relates to sound motion picture films, more particularly to a novel method of producing sound-on-film of the type insuring a perfect synchronism between the actions of a picture and accompanying speech and/or other sound effects.

According to known methods of making sound picture films, the sound is recorded photographically upon a narrow longitudinal area of the film between the picture areas and the sprocket holes or perforations, as in the case of 35 mm. film, or upon a longitudinal area opposite to a non-perforated edge of a film, as in the case of standard 16 mm. sound film.

Whereas the design of sound picture projectors, especially for 16 mm. film, has made great strides in the past and a large number of projectors are available on the market at a not too prohibitive cost for both amateur and professional use, the construction of a relatively simple and cheap sound camera of small size and bulk has met with substantial diffculties due to the complexity of the optical sound recording devices and the requirement for relatively heavy and bulky auxiliary apparatus, such as amplifiers, power supplies and the like. This applies both to amateur as well as professional or semi-professional sound film cameras for use by reporters, travellers, and in general to all cases where reduced bulk and size as well as low equipment and operating costs are of prime importance.

A forward step in the solution of the problem of producing a simple and relatively cheap sound recording camera has been made recently by using a magnetic in place of a photographic sound track, said magnetic track consisting of a strip or layer of pulverized magnetizable material deposited or coated upon the film and by utilizing known magnetic recording and reproducing devices in place of the usual optical or photographic apparatus.

While magnetic sound-on-film of this type may be produced at a cost far less compared with optical recording and at increased ease and simplicity, the industry and manufacturers are averse to changing from photographic to magnetic sound in order not to make obsolete existing sound projectors and in view of the existence of a great number of professional and amateur photographic sound films reproduced in part from theater type 35 mm. film by a reduction printing process and being available on both a purchase and rental basis.

Moreover, an advantage of the optical sound track consists in the ease with which copies or duplicates may be made by means of simple photographic printing in substantially the same manner as in the case of the picture, whereas in the case of magnetic sound a new sound track has to be recorded for each film or duplicate copy. Another difficulty experienced in connection with magnetic sound-on-film is due to the fact that the magnetic sound track upon the film may be attacked or otherwise deleteriously affected by the photographic solutions during the film processing operation and that no substantial remedy has as yet been found in the past to overcome this drawback.

Accordingly, it is an object of the present invention to provide a novel method for producing sound-on-film which combines the advantages of both the photographic and magnetic recording and reproducing methods, while substantially avoiding the drawbacks and disadvantages of either.

Another object of the invention is to enable the design of a simple and low cost sound camera and to provide a film processing method, using magnetic sound for recording and photographic sound for reproduction in a standard photographic sound-on-film projector.

A further object of the invention is to provide a novel method of producing sound picture film in a most simple and economical manner, while retaining a maximum of the processing and reproducing equipment at present being used.

With the above and further objects in view, as will appear hereafter, the invention involves generally the utilization of a combined optical and magnetic sound track applied to a single picture film, the magnetic sound track serving exclusively as a means for recording sound in synchronism with the picture, while the optical sound track serves for projecting the sound and picture in a standard photographic sound-on-film projector after transfer of the recorded magnetic sound to a photographic sound record by means of a suitable playback and re-recording system.

The above and ancillary objects of the invention will be better understood from the following detailed description taken in reference to the accompanying drawing forming part of this specification and wherein:

Figure 1 illustrates diagrammatically a motion picture camera embodying sound recording means suitable for use in connection with the invention;

Figures 2A to 2D are cross-sections of several modifications of a sound picture film according to the invention, the relative thickness of the layers of the film being shown on a greatly exaggerated scale for the sake of better illustration;

Figures 3A and 3B are diagrammatic side and top views, respectively, of a suitable processing arrangement for transferring the magnetic sound record into a photographic record in accordance with the invention; and Figure 4 is a cross-section of still another modification of a sound motion picture film according to the invention.

Like reference characters identify like parts in the different views of the drawing.

Referring to Figure 1, there is shown diagrammatically a motion picture camera of generally known construction comprising a body or casing 10 having mounted therein film supply and take-up spools 11 and 12, respectively, and means for intermittently moving a film 13 through the picture gate 14 comprising, in the example shown, a number of sprocket guide rollers 15, 16 and 17 and a reciprocating claw mechanism 18, all of usual construction. The film 13 is arranged to produce suitable loops 19 on opposite sides of the picture or projection gate 14 and to insure a smooth and uniform movement through the sound gate or magnetic recording device 22 shown arranged between the sprockets 16 and 17. Item 20 indicates the usual rotary shutter and 21 represents the lens of the camera. A microphone 23 mounted upon the front wall of the camera or in any other suitable manner and an amplifier 25 and a battery or power source 26, complete the recording equipment. Item 27 indicates a view finder of known construction, while other details like the driving motor for the camera have been omitted from the drawing for the sake of simplicity of illustration and as being unnecessary for the understanding of the invention.

Figure 2A is a cross-section through one type of sound picture film according to the invention suitable for use in the camera shown in Fig. 1. The film 13 being provided with a row of perforations 28 or sprocket holes along one of its edges, as is customary with standard 16 mm. sound film, is coated with the usual photographic emulsion comprising the picture areas 30 and a first or photographic sound track area 31. In addition to the sound track 31, the film is coated with a second magnetic sound track 32 adjoining the sound track 31 in the example illustrated, i. e. along the non-perforated edge of the film. The magnetic sound track 32 may suitably consist of a layer of finely divided magnetizable material such as iron or iron oxide powder, mixed with a suitable binder and coated upon the film by means of any of the methods known in the art.

As the film 13 is passed through the recording device or sound gate 22 in the camera, the varying sound currents supplied by the microphone 23 and amplified by the amplifier 25 will cause the successive areas of the magnetic track 32 to be subjected to varying degrees of magnetization along the length of the track, in such a manner that if the film is subsequently passed through a suitable pick-up and play-back device, the variable magnetic areas will be converted back to the corresponding sound currents suitable for reproduction by a loud speaker or other reproducing device.

The sound gate 22 may be of standard construction, such as in the form of a recording magnet having a pair of pole pieces separated by a slit or gap through or past which which the film or track 32 is passed at a uniform speed. In order to further smoothen the movement of the film through the sound recorder, to prevent flutter and other irregularities resulting in interfering or disturbing sounds, any known smoothing means such as a flywheel, resilient guide shoes pressing against the film and sound gate, etc. may be provided. Other details of the magnetic recorder such as means for quenching or erasing the magnetic track prior to the recording process are well known and have been omitted from this disclosure as not forming a part of the invention.

After both picture and sound have been recorded in the manner described, the film is forwarded to the processing station for development in the usual manner. In the latter, the recorded magnetic sound is at first converted to a latent photographic sound record, whereupon the film is developed in the usual manner to obtain a composite sound and picture negative or a positive suitable, respectively, for duplication or printing or for direct projection in a standard photographic sound film projector.

Thus, referring to Figures 3A and 3B, the film from the exposed spool 12 is shown to be passed by way of guide sprockets 35 and 36 at first through a magnetic pick-up device 37 and thereafter through a standard photographic sound recorder 38. The sound output currents supplied by the pick-up 37 are sufficiently amplified by means of a high fidelity amplifier 40 before being applied to the recorder 38. After the photographic sound track 31 has been recorded, the film may be developed and processed in the ordinary manner to produce a final composite negative or positive sound picture film.

As will be understood, the spacing between the picture gate 14 and sound gate 22 in the camera, Figure 1, expressed in units of picture frames, as well as the spacing between the reproducing device 37 and recording device 38 during the processing operation also expressed in frame units, should be such that the sum of said spacings results in the standard spacing distance between the picture and sound records in the final negative or positive sound picture film, i. e. about 26 frames in accordance with prevailing practice in sound film engineering.

The transfer from magnetic sound to photographic sound may be advantageously used for editing or monitoring purposes by controlling the gain of the amplifier by means of a suitable gain or volume resistor as indicated at 41 in the drawing. Furthermore, undesirable portions of the initially recorded sound may be eliminated by means of a simple magnetic erasing device and additional speech and/or other sound effects may be added by applying corresponding sound currents to the input of the amplifier, in a manner readily understood. In the case of photographic sound recording, such direct playback and editing is not possible due to the latent character of the initially recorded sound track.

Referring to Figure 2B, there is shown a modification of the sound picture film which differs from Figure 2A by the provision of the magnetic sound track 32 on the opposite or non-coated side of transparent base 13. Figures 2C and 2D show further modifications, wherein the sound track 32 is applied to the area along the edge of the film adjacent to the perforations 38, i. e. either upon the emulsion or non-coated side of the film, respectively.

The presence of the magnetic sound track upon the film after the latter has been developed will not interfere in any way with the subsequent use during projection or printing of additional copies from the original film; in view of the extremely small thickness of the magnetic coatings as used in magnetic tape recording and reproducing devices. Furthermore, any attack by the processing solutions upon the magnetic sound track will be of no consequence, inasmuch as the sound record has been previously transferred to the photographic track, in the manner described.

From the foregoing it will be evident that the invention combines the advantages of both photographic and magnetic sound, while substantially avoiding the disadvantages of either, aside from the main advantage of reducing the weight and bulk of a sound recording camera and retaining the use of existing sound-on-film projectors as well as processing equipment and practices.

The magnetic sound track 32 upon the film 13 may be produced in any known manner, such as by depositing a suspension or paint of finely divided magnetic particles dispersed throughout a suitable carrier or binder to give a homogeneous recording medium. The magnetic particles of iron, iron oxide or other magnetic material may have a size of one micron or less. The thickness of the track may be of the order below $\frac{1}{1000}$ of an inch so as not to interfere with the normal use of the film in a standard motion picture camera.

The carrier or binder may consist of any suitable material such as a varnish, shellac or a synthetic substance. The binder should furthermore consist of a material which does not become soft during the processing in the manner of the gelatin coating containing the light sensitive material upon the film. In addition to normal shellac and equivalent materials, vinyl chloride may be used as a satisfactory binding material for the magnetic particles. The magnetic paint or suspension is coated upon the film in liquid or semi-liquid form and will become solid upon cooling to provide a uniform and homogeneous magnetic sound track firmly bonded to the film.

In this manner, undesirable chemical effect upon the magnetic material during the processing operation of the film will be substantially prevented. If desirable, the sound track may be additionally coated with a layer of the binder or an equivalent material to completely embed the magnetic particles and to preclude any attack by the processing solutions. Thus, while the gelatin emulsion including the light sensitive material will be readily permeated by the processing solutions, the binder of the magnetic particles will resist any penetration so as to prevent undesirable chemical reaction between the highly oxidizable magnetic particles and the treating solutions, in particular the acid fixing and stop bath solutions.

According to a further modification of the invention, the magnetic sound track 32 is completely removed after the transfer of the sound record prior to the development of the film. For this purpose, the film is subjected to a solvent of the binding material of the magnetic particles, such as an alcohol or alcohol solution which will not affect or react with either the film base or the photographic emulsion. As an example, the binder for the magnetic particles may be a gum shellac solution made of gum shellac diluted with alcohol and mixed with the magnetic particles to provide a paint of suitable consistency which may be readily coated upon the film. As a consequence, by passing the film, after recording and re-recording of the sound track, through a suitable alcohol, the sound track will be readily dissolved. Subsequently, the film is subjected to a thorough rinse to prevent any iron or other magnetic particles from adhering thereto and interfering with the sound or image records. In this case, the base material such as cellulose acetate should be chosen so as not to react with the alcohol or other solvent of the binding material, as is readily understood.

In the preferred embodiment of the foregoing modification as shown in Fig. 4, the entire back of the film 13 is coated with a layer of magnetic material forming the sound track. As a result, the width of the sound track and in turn the sound storage capacity are considerably increased, which will enable a substantial simplification of the design of the sound camera and result in reduced noise due to lack of homogeneity of the recording medium. Furthermore, such a sound track coating may be deposited upon a film of large width in the same manner as the light sensitive emulsion, whereupon the film is subdivided into narrower strips of standard size. This again results in an increased uniformity or homogeneity of the sound track and the advantages connected therewith. Furthermore, the sound track as shown in Fig. 4 may serve as an anti-halo coating to prevent internal light reflections, in a manner well understood. In order to prevent magnetic particles from being loosened and deposited upon the photographic emulsion in a film wound into a spiral or roll, the sound track in Fig. 4 may be coated with a thin layer of the binder of an equivalent material to afford full protection in a manner understood.

While there have been shown and described a few desirable embodiments of the invention, it is understood that this disclosure is for the purpose of illustration and that various changes in the steps described, as well as the substitution of equivalent steps for those herein described, may be made without departing from the scope and spirit of the invention as defined in the appended claims. The specification and drawing are accordingly to be regarded in an illustrative rather than in a limiting sense.

We claim:

1. The method of recording sound upon a motion picture film having picture and photographic sound track areas and a magnetic sound track consisting of a coating of finely divided magnetizable material dispersed in a binder different from the base material of the film, comprising the steps of producing upon said film a magnetic sound record synchronously with a picture record, reproducing the recorded sound and re-recording it photographically upon said film, removing said magnetic track by subjecting the film to a solvent of said binder, and rinsing said film and developing the photographic picture and sound records.

2. The method of making sound motion picture film having picture and photographic sound track areas and a magnetic sound track arranged upon an area outside the picture areas and consisting of a coating of finely divided magnetizable material dispersed in a binder different from the film base material, comprising the steps of producing upon said film a magnetic sound record synchronously with a picture, reproducing the recorded sound and re-recording it photographically upon said film, removing said magnetic sound track by immersing the film in a solvent of said binder, and rinsing the film and developing the photographic picture and sound records.

3. The method of making sound motion picture film having picture and photographic sound track areas and a magnetic sound track upon the back of said film and overlying the emulsion surface, said sound track consisting of a coating of finely divided magnetizable material dispersed in a binder different from the film base material, comprising the steps of producing upon said film a magnetic sound record synchronously with a picture, reproducing the recorded sound and re-recording it photographically upon said film, removing said magnetic sound track by subjecting said film to a solvent of said binder, and rinsing the film and developing the photographic picture and sound records.

4. The method of recording sound upon a motion picture film having photographic picture and sound track emulsion areas and a magnetic sound track consisting of a coating of a finely divided magnetizable material dispersed in a binder different from the base material of said film and said emulsion, comprising the steps of magnetically recording sound upon said magnetic sound track synchronously with the recording of a picture upon the picture emulsion area, transducing the magnetic sound record and simultaneously re-recording it photographically upon the photographic sound track area of said film, subjecting the film to a solvent of said binder for removing said magnetic sound track, and rinsing the film and developing the photographic picture and sound records.

PETER F. ROSSMANN.
KARL RATH.

REFERENCES CITED

The following references are of record in the file of this patent:

UNITED STATES PATENTS

| Number | Name | Date |
| --- | --- | --- |
| 1,679,708 | Bullis | Aug. 7, 1928 |
| 1,808,046 | Kuchenmeister | June 2, 1931 |
| 1,866,712 | Jones | July 12, 1932 |

FOREIGN PATENTS

| Number | Country | Date |
| --- | --- | --- |
| 347,347 | Great Britain | Apr. 30, 1931 |
| 389,434 | Great Britain | Mar. 16, 1933 |